(12) United States Patent
Zuniga et al.

(10) Patent No.: US 10,082,016 B2
(45) Date of Patent: Sep. 25, 2018

(54) COMPOSITIONS OF AND METHODS FOR MAKING STABLE CARBONACEOUS NANOMATERIALS

(71) Applicants: Aramco Services Company, Houston, TX (US); Massachusetts Institute of Technology, Cambridge, MA (US)

(72) Inventors: Carlos A. Zuniga, Cambridge, MA (US); John B. Goods, Cambridge, MA (US); Jason R. Cox, Houston, TX (US); Timothy M. Swager, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 93 days.

(21) Appl. No.: 15/170,392

(22) Filed: Jun. 1, 2016

(65) Prior Publication Data

US 2016/0348498 A1 Dec. 1, 2016

Related U.S. Application Data

(60) Provisional application No. 62/169,398, filed on Jun. 1, 2015.

(51) Int. Cl.
*C09K 8/588* (2006.01)
*E21B 47/10* (2012.01)
(Continued)

(52) U.S. Cl.
CPC .......... *E21B 47/1015* (2013.01); *C01B 31/02* (2013.01); *C01B 31/043* (2013.01);
(Continued)

(58) Field of Classification Search
CPC ...................................... B82Y 30/00
See application file for complete search history.

(56) References Cited

U.S. PATENT DOCUMENTS 7,931,838 B2    4/2011 Marand et al.
7,939,047 B2 *  5/2011 Tour .................. B82Y 30/00
                                                   209/1
(Continued)

FOREIGN PATENT DOCUMENTS

CN    103951800 A    7/2014
KR    201400184 A    2/2014

OTHER PUBLICATIONS

International Search Report and Written Opinion for related PCT application PCT/US2016/035233 dated Sep. 21, 2016.
(Continued)

*Primary Examiner* — Michael A Salvitti
(74) *Attorney, Agent, or Firm* — Bracewell LLP; Constance G. Rhebergen; Kevin R. Tamm

(57) ABSTRACT

A composition for stabilizing dispersed particles in an ionically charged solution is disclosed. The composition includes a carbonaceous substrate, the carbonaceous substrate operable to undergo a grafting-to approach for functionalization. The composition also includes a covalently bound stabilizing polymer, the covalently bound stabilizing polymer operable to be prepared as a diazonium salt for grafting to the carbonaceous substrate and a plurality of positively and negatively charged subgroups, the plurality of positively and negatively charged subgroups positioned within the covalently bound stabilizing polymer, where the plurality of positively and negatively charged subgroups are operable to stabilize the dispersed particles amongst positively and negatively charged ions within the ionically charged solution.

26 Claims, 10 Drawing Sheets

(51) Int. Cl.
| | |
|---|---|
| C01B 31/02 | (2006.01) |
| C01B 31/04 | (2006.01) |
| C08F 226/06 | (2006.01) |
| B82Y 30/00 | (2011.01) |
| B82Y 40/00 | (2011.01) |

(52) U.S. Cl.
CPC ........ *C01B 31/0484* (2013.01); *C08F 226/06* (2013.01); *C09K 8/588* (2013.01); *B82Y 30/00* (2013.01); *B82Y 40/00* (2013.01); *C09K 2208/10* (2013.01)

(56) References Cited

U.S. PATENT DOCUMENTS

| | | | | |
|---|---|---|---|---|
| 8,362,295 | B2* | 1/2013 | Tour | B82Y 30/00 423/415.1 |
| 8,703,090 | B2* | 4/2014 | Tour | B82Y 30/00 423/415.1 |
| 8,925,736 | B2 | 1/2015 | Rodrigues et al. | |
| 2008/0045420 | A1 | 2/2008 | Karagianni et al. | |
| 2009/0202816 | A1 | 8/2009 | Schlenoff | |
| 2010/0105834 | A1* | 4/2010 | Tour | B82Y 30/00 525/50 |
| 2011/0097277 | A1 | 4/2011 | Jiang et al. | |
| 2012/0141797 | A1 | 6/2012 | Sherman et al. | |
| 2015/0004667 | A1* | 1/2015 | McKinney | C07K 17/14 435/188 |
| 2015/0246128 | A1* | 9/2015 | Cui | A61K 9/0009 604/503 |
| 2015/0318531 | A1* | 11/2015 | Kung | H01M 10/4235 429/145 |
| 2016/0225538 | A1* | 8/2016 | Xie | C08G 73/0266 |
| 2016/0348498 | A1* | 12/2016 | Zuniga | E21B 47/1015 |

OTHER PUBLICATIONS

Kim, et al., "High-density assembly of gold nanoparticles with zwitterionic carbon nanotubes and their electrocatalytic activity in oxygen reduction reaction", Chemical Communications, Dec. 20, 2012, p. 8940,vol. 48, No. 71.
Paulus et al., "Convalent Electron Transfer Chemistry of Graphene with Diazonium Salts", Accounts of Chemical Research., Jan. 15, 2015, pp. 160-170, vol. 46, No. 1.
Yang et al., "Synthesis of PNIPAM polymer brushes on reduced graphene oxide based on click chemistry and RAFT polymerization", Journal of Polymer Science Part A: Polymer Chemistry, Oct. 23, 2011, pp. 329-337, vol. 50 No. 2.
Zuniga, et al.: "Long Term High Temperature Stability of functionalized Graphene Oxide Nanoplatelets in Arab-D and API Brine", ACS Applied Materials and Interfaces, Jan. 27, 2016, pp. 1780-1785, vol. 8, No. 3.
Liu, T, "Ion-Responsive Channels of Zwitterion-Carbon Nanotube Membrane for Rapid Water Permeation and Ultrahigh Mono-Multivalent Ion Selectivity," Article, ASC Nano, vol. 9, No. 7, pp. 7488-7496, 2015.
Zhang, B., Growing Poly (N-vinylcarbazole) from the Surface of Graphene Oxide via RAFT Polymerization, Journal of Polymer Science, Part A: Polymer Chemistry, vol. 49, 2043-2050, 2011.
Martin-Garcia, B., "Functionalization of Reduced Graphite Oxide Sheets with a Zwitterionic Surfactant," ChemPhysChem 2012, 13, 3682-3690.
Zhang, B., "Poly(N-Vinycarbazole) Chemically Modified Graphene Oxide," Journal of Polymer Science: Part A: Polymer Chemistry, vol. 48, 2642-2649 (2010).
Bagaria, H., "Iron Oxide Nanoparticles Grafted With Sulfonated Copolymers are Stable in Concentrated Brine at Elevated Temperatures and Weakly Adsorb on Silica," ACS Appl. Mater. Interfaces 2013, 5, 3329-3339.
Hwang, G., "Highly Stable Carbon Nanoparticles Designed for Downhole Hydrocarbon Detection," Energy Environ. Sci. 2012, 5, 8304-8309.
Vasantha, V., "Water Swelling, Brine Soluble Imidazole Based Zwitterionic Polymers—Synthesis, Studies of Reversible UCST Behaviour and Gel-Sol Transitions," J.G. Chem. Comm. 2014, 50, 46.
Dreyer, D., The Chemistry of Graphene Oxide, Chem. Soc. Rev. 2010, 39, 228-240.
Compton, O., "Graphene Oxide Highly Reduced Graphene Oxide, and Graphene: Versatile Building Blocks for Carbon-Based Materials," Small 2010, 6, No. 6, 711-823.
Wang, H., Graphene-Wrapped Sulfur Particles as a Rechargeable Lithium-Sulfur Battery Cathode Material With High Capacity and Cycling Stability, Nano Lett., 2011, 11, 2644-2647.
Sivaramapanicker, S., "Graphene Oxide Wrapping on Squaraine-Loaded Mesoporous Silica Nanoparticles for Bioimaging," J. Am. Chem. Soc., 2013, 134, 17346-17349.
Ma, X., "Graphene Oxide Wrapped Gold Nanoparticles for Intracellular Raman Imaging and Drug Delivery," J. Mater. Chem. B., 2013, 1, 6495-6500.
Yoon, K., "Graphene Oxide Nanoplatelet Dispersions in Concentrated NaCl and Stabilization of Oil/Water Emulsions," J. Colloid and Interf. Sci., 2013, 403, 1-6.
Lowe, A., "Synthesis and Solution Properties of Zwitterionic Polymers," Chem. Rev. 2002, 102, 4177-4189.
Israelachvili, J., "Repulsive Steric or Overlap Forces Between Polymer-Covered Surfaces," Intermolecular and Surface Forces, 3rd Ed., 2011, Chapter 16, pp. 387-392.
Israelachvili, J., "Polyelectrolytes," Intermolecular and Surface Forces, 3rd Ed., 2011, Chapter 16, pp. 402-404.
Quintana, R.,"Sulfobetaine-Based Polymer Brushes in Marine Environment: Is There an Effect of the Polymerizable Group on the Antifouling Performance," Elsevier, Colloids and Surfaces B: Biointerfaces 120 (2014) 118-124.
Wever, D., "Polymers for Enhanced Oil Recovery: A Paradigm for Structure-Property Relationship in Aqueous Solution," Elsevier, Progress in Polymer Science 36 (2011), 1558-1628.
Lomeda, J.,"Diazonium Functionalization of Surfactant-Wrapped Chemically Converted Graphene Sheets," J. Am. Chem. Soc. 2008, 130, 16201-16206.
Wei, G., "Covalent Modification of Reduced Graphene Oxide by Means of Diazonium Chemistry and Use as a Drug-Delivery System," Chem. Eur. J. 2013, 18, 14708-14716.
Paulus, G., "Covalent Electron Transfer Chemistry of Graphene With Diazonium Salts," Acc. Chem. Res. 2012, 46, 160.
Nguyen, K., "Integrated Graphene/Nanoparticle Hybrids for Biological and Electronic Applications," Nanoscale 2014, 6, 6245.
Englert, J., "Covalent Bulk Functionalization of Graphene," Nature Chemistry, vol. 3, 279, Apr. 2011.

* cited by examiner

COMPOSITIONS OF AND METHODS FOR MAKING STABLE CARBONACEOUS NANOMATERIALS

RELATED APPLICATIONS

The present application is a non-provisional application of and claims priority to U.S. Prov. App. No. 62/169,398, filed Jun. 1, 2015, the entire disclosure of which is hereby expressly incorporated herein by reference.

BACKGROUND

1. Field

The present disclosure relates generally to compositions of and methods for making carbonaceous nanomaterials, which are stable in high-salinity, high-temperature conditions. More particularly, the present disclosure relates to zwitterionic compounds that exhibit colloidal stability in high-salinity, high-temperature subterranean environments, such as that of a hydrocarbon-bearing reservoir.

2. Description of the Related Art

Stabilization of nano-sized materials in aqueous environments with high salinities (high ionic strength) is of interest, because such stabilized materials can have great utility in various applications, for example in the petroleum industry. Nanoscale materials can be injected deep into oil reservoirs, and can act as imaging enhancers or act as reporter probes, providing useful information on the state of the reservoirs. Stable nanoscale materials provide the opportunity to improve recovery yields from hydrocarbon-bearing reservoirs. However, the internal environments of oil reservoirs contain high-salinity and high-temperature brines which can readily destabilize nanomaterials injected into them. In addition, certain carbonaceous nanomaterials, such as for example graphene, are hydrophobic and tend to aggregate or flocculate in aqueous solutions, which is undesirable in many applications.

It has been shown that iron oxide nanoparticles wrapped with poly(2-acrylamido-2-methylpropanesulfonate-co-acrylic acid) (also known as poly(AMPS-co-AA)) were effectively stabilized in American Petroleum Institute (API) brine (aqueous 8 wt. % sodium chloride and 2 wt. % calcium chloride) at 90° C. for up to one month. The ionic nature of the polymer successfully imparted electrosteric stabilization and repulsion required to stabilize the nanoparticles against agglomeration in the brine.

Another example also using an ionic polymer was shown to stabilize carbon nanoparticles in API brine. Polyvinyl alcohol (PVA or PVOH) was grafted onto the surface of the nanoparticles and could be sulfated with a chlorosulfonic acid treatment. Lightly sulfated nanoparticles could be stably dispersed in API brine at 100° C. The un-sulfated nanoparticles were not dispersible in the brine. The highly sulfated nanoparticles were not as stable as the lightly sulfated variant forming a suspension of small particulates upon heating.

Highly oxidized graphene oxide (GO) (made with a 5:1 permanganate ratio versus the typical 3:1) formed stable dispersions in aqueous concentrated sodium chloride solutions up to 5 wt. %. The stability of the GO sheets in the brine was ascribed to the presence of a large number of negatively charged groups on the sheet edges that provide sufficient electrostatic repulsion even in a high ionic strength environment. This GO could be used to stabilize oil/water emulsions, but was not examined under harsher conditions including higher ionic strength brine and/or elevated temperatures.

Zwitterionic groups (species containing linked cationic and anionic groups with an overall neutral charge) have excellent brine solubility and stability due to what is referred to as the antipolyelectrolyte effect. This effect causes the chain to expand upon addition of electrolytes which help to stabilize it against agglomeration and destabilization through steric effects (electrosteric stabilization). Such materials have been used in applications including seawater antifouling coatings.

There is a need for compositions of and methods for making carbonaceous nanomaterials that are stable in a suspension at high-salinity and high-temperature conditions.

SUMMARY

Partially-reduced graphene oxide (prGO) was covalently functionalized with a diazonium-containing, imidazolium-based, polyzwitterionic polymer to afford a composite material with excellent dispersibility and long-term stability in high-salinity brines, including standard API and Arab-D brines, both of which are found in deep oil reservoirs. Embodiments of the polymer contain zwitterionic groups as stabilization moieties in brine solutions and covalent anchoring groups to ensure long-term attachment of the coating to a carbon nanomaterial at high temperatures. When heated at 90° C., the dispersions remained stable up to and beyond 140 days. Imidazolium-based polymers of the present disclosure provide for brine stabilization of carbonaceous nanomaterials, and the use of diazonium containing polymers provide a useful "grafting-to" approach for functionalization of carbonaceous nanomaterials.

The present disclosure includes copolymers which contain a zwitterionic side-chain segment (or a segment with side-groups capable of being converted into zwitterionic groups) and at least one segment (capable of forming a diazonium species permitting covalent bonding to a carbonaceous surface) attached to a carbonaceous material surface. Copolymers are synthesized to have a controlled ratio of copolymer segments and then grafted to a carbonaceous surface, such as, for example, a partially-reduced graphene via diazonium chemistry. When such copolymers are covalently attached to a carbonaceous surface, they stabilize carbonaceous materials in high ionic strength aqueous environments (brines) for prolonged periods of time, at high temperatures, or both for use in petroleum applications. In some embodiments, the covalently grafted copolymers do not form coatings or membranes surrounding the carbonaceous materials, but rather form stabilizing side-groups. In some embodiments, the side-groups are spaced apart and are not bonded or cross-linked to other side groups arising from the carbonaceous material surface.

In certain embodiments of the present disclosure, a strong, covalent C—C bond is formed between stabilizing side-groups and a surface of a carbonaceous nanomaterial, such as the basal plane of a sheet of graphene. The carbonaceous material, for example a carbonaceous nanomaterial, is functionalized by polymeric side-groups. In some embodiments, polymeric in addition to or alternative to co-polymeric side-groups are covalently bonded to the surface of a carbonaceous material via a diazonium reaction. In some embodiments, the side-groups are bonded to the carbonaceous nanomaterials without ester linkages, but rather with C—C covalent bonds. In some embodiments, by covalently grafting polymers to a carbonaceous surface thereto to form a strong C—C bond, unexpected and surprising prolonged stability in brine, including at high temperatures, is achieved.

Functionalization of nano-sized graphene sheets (less than about 1 µm thick) provides the ability to meet the demanding conditions for dispersibility and stability in high-salinity brines at elevated temperatures. Advantages of this approach include the large surface area and chemical reactivity of the graphene oxide (GO) basal plane, which facilitate functionalization, as well as the potential to encapsulate nanomaterials deemed of interest.

Submicron sized GO sheets (about 300 nm in hydrodynamic radius) were successfully stabilized by covalently attaching poly(vinylimidazole)-co-poly(aminostyrene) copolymer (referred to as PVIM-co-PVPy) onto the sheets through diazonium chemistry. The attached polymer was then subjected to a post-functionalization reaction with 1,3-propane sultone to yield a zwitterionic-type polymer (see FIG. 1). The zwitterionic polymer-prGO composite material disclosed as follows is stable in both standard API brine, as well as a higher ionic strength brine known as Arab-D, with excellent long-term stability upon standing at 90° C. (at least up to 140 days). The dispersion stability was monitored both visually and spectroscopically. Dynamic light scattering (DLS) was used to monitor changes in average particle size over time.

Therefore, disclosed herein is a composition for stabilizing dispersed particles in an ionically charged solution, the composition comprising a carbonaceous substrate, the carbonaceous substrate operable to undergo a grafting-to approach for functionalization; a covalently bound stabilizing polymer, the covalently bound stabilizing polymer operable to be prepared as a diazonium salt for grafting to the carbonaceous substrate; and a plurality of positively and negatively charged subgroups, the plurality of positively and negatively charged subgroups positioned within the covalently bound stabilizing polymer. The plurality of positively and negatively charged subgroups are operable to stabilize the dispersed particles amongst positively and negatively charged ions within the ionically charged solution.

In some embodiments, the carbonaceous substrate comprises partially-reduced graphene oxide. In other embodiments, the composition comprises particles with a mean diameter size of between about 750 nanometers (nm) and about 1 micron. Still in other embodiments, the composition comprises particles with a mean diameter size of between about 700 nm and about 800 nm. Still in other embodiments, the composition comprises particles with a mean diameter size of between about 1 nm and about 10 nm, between about 10 nm and about 100 nm, between about 200 nm and about 300 nm, between about 400 nm and about 600 nm, between about 600 nm and about 1 micron, and between about 1 micron and about 10 microns. In some embodiments, smaller carbonaceous materials, such as, for example, $C_{60}$ and carbon nanoplatelets, can be functionalized by the co-polymers of the present disclosure. The mean diameter size of the functionalized carbonaceous materials is larger than that of the carbonaceous materials by themselves.

In some embodiments, the covalently bound stabilizing polymer comprises poly(vinylimidazole)-co-poly(aminostyrene). In certain embodiments, the covalently bound stabilizing polymer comprises a polyzwitterionic polymer. In yet other embodiments, the covalently bound stabilizing polymer comprises imidazole-sulfobetaine groups.

In some embodiments, the plurality of positively and negatively charged subgroups are operable to stabilize the dispersed particles amongst positively and negatively charged ions within brine solution comprising sodium, calcium, and chloride ions. Still in other embodiments, the plurality of positively and negatively charged subgroups are operable to stabilize the dispersed particles amongst positively and negatively charged ions within brine solution comprising sodium, calcium, magnesium, chloride, barium, sulfate, and bicarbonate ions. In certain embodiments, the composition comprises zwitterionic poly(vinylimidazole)-co-poly(aminostyrene) partially-reduced graphene oxide composite.

Additionally disclosed is a method for making a composition for stabilizing dispersed particles in an ionically charged solution, the method comprising the steps of preparing a carbonaceous substrate such that the carbonaceous substrate is operable to undergo a grafting-to approach for functionalization, preparing a stabilizing polymer, covalently bonding the carbonaceous substrate and the stabilizing polymer to form a combined particle, imparting a plurality of positive and negative charges to the stabilizing polymer, and stabilizing the combined particle in the ionically charged solution to avoid agglomeration, by using the plurality of positive and negative charges to stabilize the combined particle amongst positively and negatively charged ions within the ionically charged solution.

In some embodiments of the method, the method further comprises the step of preparing the stabilizing polymer as a diazonium salt for grafting to the carbonaceous substrate. In other embodiments, the method further comprises the step of partially reducing graphene oxide. Still in other embodiments, the method further comprises the step of forming particles with a mean diameter size of between about 750 nanometers (nm) and about 1 micron. In yet other embodiments, the method further comprises the step of forming particles with a mean diameter size of between about 700 nm and about 800 nm. Still in other embodiments, the method further comprises the step of preparing a polymer comprising poly(vinylimidazole)-co-poly(aminostyrene).

In certain embodiments, the method further comprises the step of forming a polyzwitterionic polymer. Still in other embodiments, the polyzwitterionic polymer comprises imidazole-sulfobetaine groups. In some embodiments, the method further comprises the step of stably dispersing the combined particle amongst positively and negatively charged ions within brine solution comprising sodium, calcium, and chloride ions. In certain embodiments, the method further comprises the step of stably dispersing the combined particle amongst positively and negatively charged ions within brine solution comprising sodium, calcium, magnesium, chloride, barium, sulfate, and bicarbonate ions. In certain embodiments, the method further comprises the step of forming zwitterionic poly(vinylimidazole)-co-poly(aminostyrene) partially-reduced graphene oxide composite. And in still other embodiments, the method further comprises the step of injecting the combined particle into a hydrocarbon-bearing reservoir formation to characterize the formation.

BRIEF DESCRIPTION OF THE DRAWINGS

So that the manner in which the recited features, aspects and advantages of the disclosure, as well as others that will become apparent, are attained and can be understood in detail, a more particular description of certain embodiments briefly summarized above can be had by reference to the embodiments that are illustrated in the drawings that form a part of this specification. It is to be noted, however, that the appended drawings illustrate only exemplary embodiments and are, therefore, not to be considered limiting of the disclosure's scope, for the disclosure can admit to other equally effective embodiments.

DETAILED DESCRIPTION OF THE EXEMPLARY EMBODIMENTS

Figure 1:
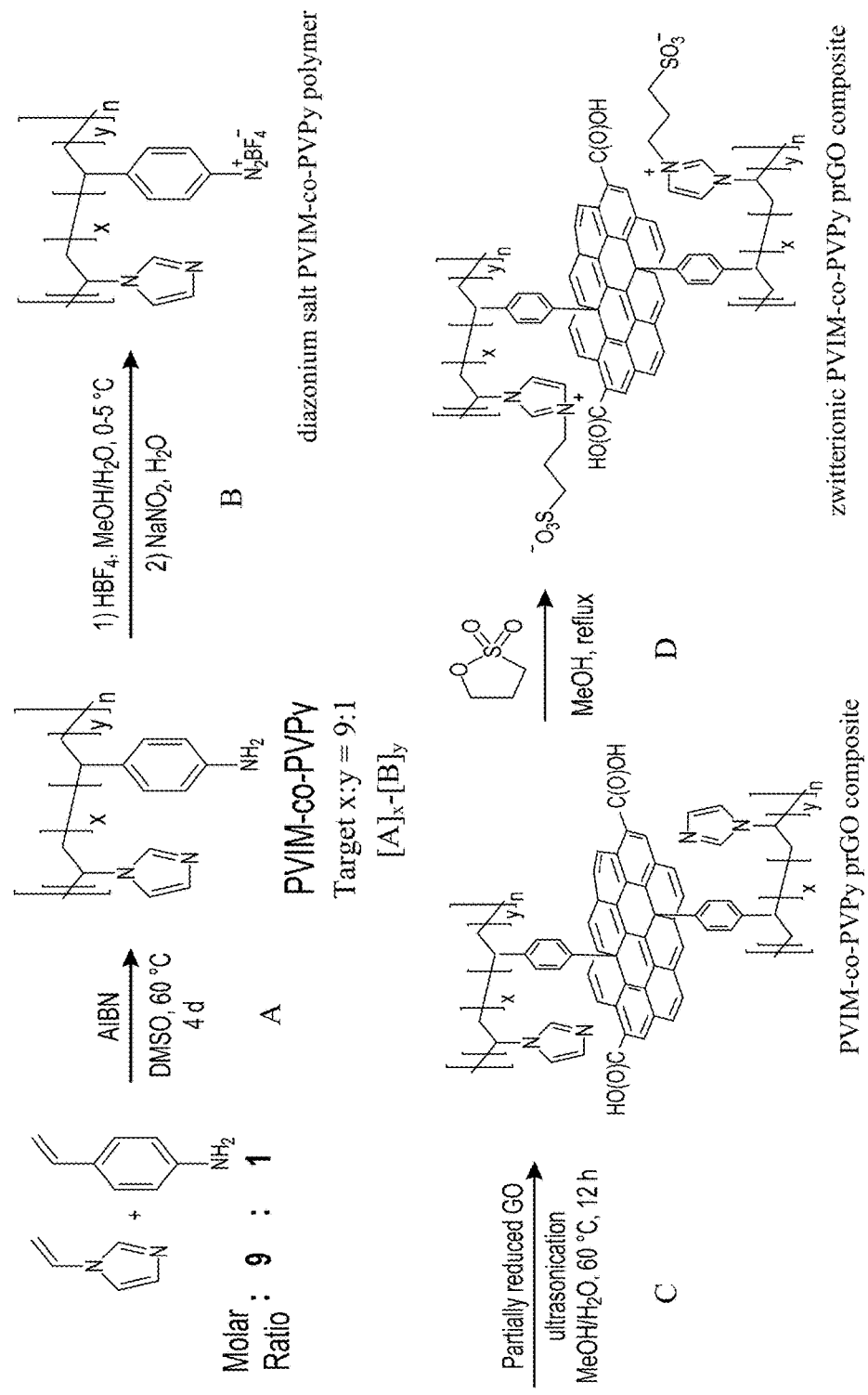
FIG. 1 is a reaction scheme for the synthesis of a zwitterionic poly(vinylimidazole)-co-poly(aminostyrene) partially-reduced graphene oxide composite, also referred to as zwitterionic PVIM-co-PVPy prGO composite.

Referring first to FIG. 1, a reaction scheme is shown for the synthesis of a zwitterionic poly(vinylimidazole)-co-poly(aminostyrene) partially-reduced graphene oxide composite, also referred to as zwitterionic PVIM-co-PVPy prGO composite. Certain embodiments of the synthesis of the zwitterionic PVIM-co-PVPy prGO composite are exemplified by the following experiments. Partially reduced GO refers to a GO wherein the atomic percentage of oxygen-containing species has been reduced to be in the range of about 25% or less, 20% or less, 15% or less, or 10% or less; as can be determined by XPS. In the preferred embodiments, the reduction of oxygen content is not to a level wherein the GO would be considered reduced GO, nor wherein the material completely loses dispersibility in water, or under aqueous conditions.

General Materials and Methods:

In the exemplified embodiments described, chemicals were purchased from Sigma-Aldrich and used as received unless stated otherwise. X-ray photoelectron spectroscopy (XPS) analyses were performed on a Versaprobe II X-ray photoelectron spectrometer from Physical Electronics with a monochromated Al Kα X-ray source (1486.6 eV) and operated at a base pressure of $1\times10^{-9}$ Torr with 45.7 Watts of power, a 200 μm spot beam size and a take-off angle of 45°.

The XPS spectra were analyzed and atomic peaks were integrated using CasaXPS software to determine the relative atomic percentages of the element species present in the samples. Thermogravimetric analyses (TGA) were performed on a TA Instruments Discovery TGA in the range of about 50-800° C. at a constant ramp rate of 20° C. $min^{-1}$ under nitrogen atmosphere. Percent transmittance (% T) spectra of composite in brine samples were taken on a Varian Cary 6000i instrument using a zero/background correction in quartz cuvettes. Dynamic light scattering (DLS) (Brookhaven Instruments BI-200SM) of the brine with dispersed composites was performed by adding a small amount of the tested dispersions into filtered brine.

In DLS measurements, the longest dimension of the graphene sheet defines the hydrodynamic diameter of the sheet. The data was collected in triplicate at a 90° scattering angle for 3 minutes at room temperature and fitted using the CONTIN algorithm. The CONTIN algorithm is used to fit the autocorrelation function during scattering measurements. The CONTIN algorithm is described in detail in "CONTIN: A General Purpose Constrained Regularization Program for Inverting Noisy Linear Algebraic and Integral Equations" by Provencher, S. W., in Computer Physics Communications 27 (1982) 229-242.

Graphene Oxide Preparation Procedure:

Ten grams (g) of graphite (natural flake, from Alfa Aesar, 2-15 micrometers (μm)) was ball-milled at 30 hertz (Hz) for 30 minutes, then dispersed in 200 milliliters (mL) of concentrated $H_2SO_4$ and stirred at 0° C. Thirty grams of $KMnO_4$ was added portion-wise over a 2 hour period so as not to allow the temperature to exceed 20° C. The mixture was allowed to return to room temperature and stirred overnight, then 500 mL of ice-water was added slowly. Following this, 20 mL of 30% $H_2O_2$ was added. Five hundred milliliters of ice-water was then poured into the reaction and stirred for 3 hours. The resulting solids were then collected via ultracentrifugation and re-dispersed in 10% aqueous HCl, and subsequently washed with copious amounts of deionized (DI) water. The solids were then dialyzed against DI water until the water reached a pH of approximately 4.

In other embodiments, graphite need not be used as the starting material to produce zwitterionic PVIM-co-PVPy prGO composite, and other materials including any one of or any combination of carbon black, activated carbon, carbon nanotubes, and carbon 60 ($C_{60}$) can be used.

Synthesis of Poly(Vinylimidazole)-Co-Poly(Aminostyrene) (Also Referred to as PVIM-Co-PVPy):

Referring to step A of FIG. 1, 1-vinylimidazole, 4-aminostyrene, and dimethyl sulfoxide (DMSO) were distilled prior to use. 1-vinylimidazole (2.51 g, 26.7 mmol), 4-aminostyrene (0.32 g, 2.7 mmol), and DMSO (5 mL) were combined in a Schlenk tube with a stir bar. A molar feed ratio of 9:1 of 1-vinylimidazole: 4-aminostyrene was prepared by radical polymerization initiated by azobisisobutyronitrile ("AIBN") in DMSO and polymerized at 60° C. for four days. While a molar feed ratio of 9:1 was exemplified, other ratios such as about 20:1, 10:1, 5:1, 1:1, 1:5, 1:10, and 1:20 may be suitable depending on the vinyl-based molecule selected and depending on the molecule selected to enact diazonium chemistry.

The aminostyrene groups permitted the use of diazonium chemistry for producing covalent attachments of the polymer chain directly to the graphene basal plane (described further as follows). The mixture was degassed by freeze-pump-thaw (3 times), sealed under static inert atmosphere, and stirred at 60° C. for four days. The resulting lightly yellow viscous solution was cooled and diluted by the addition of methanol. The mixture was precipitated into acetone (2 times) and then dried overnight to produce a clear hard yellow solid.

While the example shown polymerizes 1-vinylimidazole and 4-aminostyrene to form PVIM-co-PVPy, as shown in FIG. 1, other co-polymers of the formula $[A]_x$-$[B]_y$ would be suitable. For example, other than 1-vinylimidazole, other vinyl-based segments having a side-group other than imidazole are suitable for conversion to a zwitterionic side chain. For example, $[A]_x$-$[B]_y$ where segment A is formed from a vinyl-based polymerizable group and further comprises a side chain group which is zwitterionic or which can be converted (such as in post-functionalization of the carbonaceous material) to a zwitterionic group, and B includes a vinyl-based polymerizable group and is capable of forming a diazonium species. Although one preferred embodiment of the zwitterionic side chain is based on an imidazole which is reacted with propane sultone, other zwitterionic side-groups can be used to achieve a stabilizing effect.

In the embodiment shown, a co-polymer is synthesized; however, in other embodiments additional polymer segments, such as $[C]_z$ could be used to form a terpolymer such as $[A]_x$-$[B]_y$-$[C]_z$. Such a segment may comprise a labile linker L and an agent, such as a dye, tracer, or other agent, which is released under certain conditions which cleave the linker (thermal, pH, etc.). Preferred embodiments of the copolymer comprise at least a zwitterionic side chain segment (or one capable of being converted into a zwitterionic segment after grafting/functionalization of the carbonaceous material) and at least one segment capable of forming a diazonium group (prior to grafting to the carbonaceous material).

Synthesis of Covalently Functionalized PVIM-Co-PVPy—Partially-Reduced Graphene Oxide (prGO) Composite (Also Referred to as PVIM-Co-PVPy prGO Composite):

First, to prepare the prGO, 15 mL of graphene oxide (GO) dispersed in DI water (1 mg mL$^{-1}$) was diluted up to a total volume of 30 mL with DI water. l-Ascorbic acid (15.1 mg) was added and the mixture was stirred at 60° C. for one hour and then rapidly chilled to less than about 5° C. and set aside for immediate use.

Separately, and referring now to step B of FIG. 1, 150.5 mg of the PVIM-co-PVPy polymer was dissolved in methanol (50 mL) under mild sonication and stirring for 5 minutes. For preparation of a diazonium salt PVIM-co-PVPy polymer, 48% aqueous tetrafluoroboric (HBF$_4$) acid (25.8 mg) was dissolved in DI water (10 mL) and added to the methanol mixture. The solution was subsequently chilled to between about 0° C. and 5° C. In a separate vial, sodium nitrite (NaNO$_2$) (9.8 mg) was dissolved in DI water (2 mL) and likewise chilled.

As shown by Step B of FIG. 1, diazonium salt PVIM-co-PVPy polymer is formed. One of ordinary skill in the art will realize that there are a number of ways to transform an aniline to a diazonium under a variety of diazotization conditions.

The sodium nitrite solution was added to the solution of PVIM-co-PVPy with stirring, and after 15 minutes the chilled prGO dispersion was added slowly and stirred for 30 minutes, as shown by step C of FIG. 1. Afterward, the mixture was sonicated for 30 minutes and then stirred at 60° C. overnight. The cooled solution was concentrated in vacuo, and then sufficient acetone was added to induce flocculation. The solids were collected by centrifugation (5,000 rpm; 15 min). The solids were air dried and used directly in step D.

Synthesis of Zwitterionic PVIM-Co-PVPy prGO Composite:

The PVIM-co-PVPy prGO composite solids produced from step C and collected by centrifugation were then sonicatively dispersed in methanol (100 mL), and 1,3-propane sultone (350.2 mg) was added, as shown by step D in FIG. 1. The mixture was refluxed under inert atmosphere overnight, and then 30 mL of DI water was added. Afterward, the cooled solution was centrifuged (2,500 rpm, 15 min), and the supernatant was decanted. The remaining solids were washed with methanol and DI water. After centrifugation, the supernatant was combined with the previously collected solution. The methanol was removed from the supernatant in vacuo to afford the Zwitterionic PVIM-co-PVPy prGO composite as a dispersion in water (~45 mL) and stored in a sealed container. The remaining solids isolated from centrifugation were lyophilized.

In other embodiments, sulfur-containing reactants other than 1,3-propane sultone could be used to form sulfobetaines in the Zwitterionic PVIM-co-PVPy prGO composite. In some embodiments, reactants are used to produce carboxybetaines in the Zwitterionic PVIM-co-PVPy prGO composite.

Zwitterionic species and polyzwitterions exhibit the anti-polyelectrolyte effect that can provide dispersion stability in high ionic strength environments. Therefore, an imidazole-based sulfobetaine zwitterionic copolymer was developed containing aminostyrene groups. Specifically, a random copolymer of 1-vinylimidazole and 4-aminostyrene with a molar feed ratio of 9:1 was prepared by radical polymerization initiated by azobisisobutyronitrile ("AIBN") in DMSO and polymerized at 60° C. for four days (FIG. 1). The aminostyrene groups permitted the use of diazonium chemistry for producing covalent attachments of the polymer chain directly to the graphene basal plane.

The use of a diazonium-containing polymer in a "grafting-to" approach is particularly advantageous for covalently functionalizing graphene with a relatively high number of functional groups. A grafting-to approach refers to the attachment of a substrate to the graphene sheets after the substrate, such as the PVIM-co-PVPy polymer, has been formed, rather than a "grafting-from" approach, in which a substrate is formed on the graphene sheet's surface from independent units attached to the sheet's surface.

As noted previously, covalent functionalization of the graphene sheets was carried out as shown in FIG. 1 by first preforming the diazonium salt of the aminostyrene groups present in the PVIM-co-PVPy polymer under conditions with tetrafluoroboric acid and sodium nitrite in methanol. Separately, a partial reduction of GO was carried out by reaction with 1-ascorbic acid at a low 1:1 weight ratio of GO:1-Ascorbic acid to increase the graphitic domains available for reaction with the diazonium species. The prGO which remained dispersed in water was rapidly chilled and subsequently added to the diazonium-containing PVIM-co-PVPy solution as shown in FIG. 1, step C. A mass excess of the polymer PVIM-co-PVPy versus prGO was used to promote more extensive functionalization of the graphene sheets.

In order to establish baseline dispersion and stability of the zwitterionic PVIM-co-PVPy prGO composite, two testing brines were chosen: (1) Arab-D brine and (2) standard American Petroleum Institute (API) brine. Arab-D brine can be found in the largest oil well in the world known as the Ghawar field found in Saudi Arabia. Table 1 provides the relative weight percentages and salt compositions of the high-salinity brines. As compared to standard API brine, Arab-D brine possesses a more complex salt mixture and a significantly higher content of divalent ion species like calcium chloride and magnesium chloride.

Preparation of Arab-D Brine:

Sodium chloride (37.3 g), calcium chloride dihydrate (24.9 g), magnesium chloride hexahydrate (6.6 g), barium chloride (5 mg), sodium sulfate (0.3 g) and sodium bicarbonate (0.26 g) were dissolved to a total volume of 500 mL in high purity distilled water.

Preparation of American Petroleum Institute (API) Brine:

Sodium chloride (20.0 g) and calcium chloride dihydrate (5.0 g) were dissolved in high purity distilled water (225 mL). The relative weight percentages of different salts in the Arab-D and API brines are shown in Table 1.

TABLE 1

Relative Weight Percentages of Salts in Brine Solutions

| Salt Species | Arab D | API |
|---|---|---|
| NaCl | 7.5% | 8.0% |
| $CaCl_2 \cdot 2H_2O$ | 5.0% | 2.0% |
| $MgCl_2 \cdot 6H_2O$ | 1.3% | — |
| $BaCl_2$ | 0.001% | — |
| $Na_2SO_4$ | 0.006% | — |
| $NaHCO_3$ | 0.005% | — |

Figure 2:
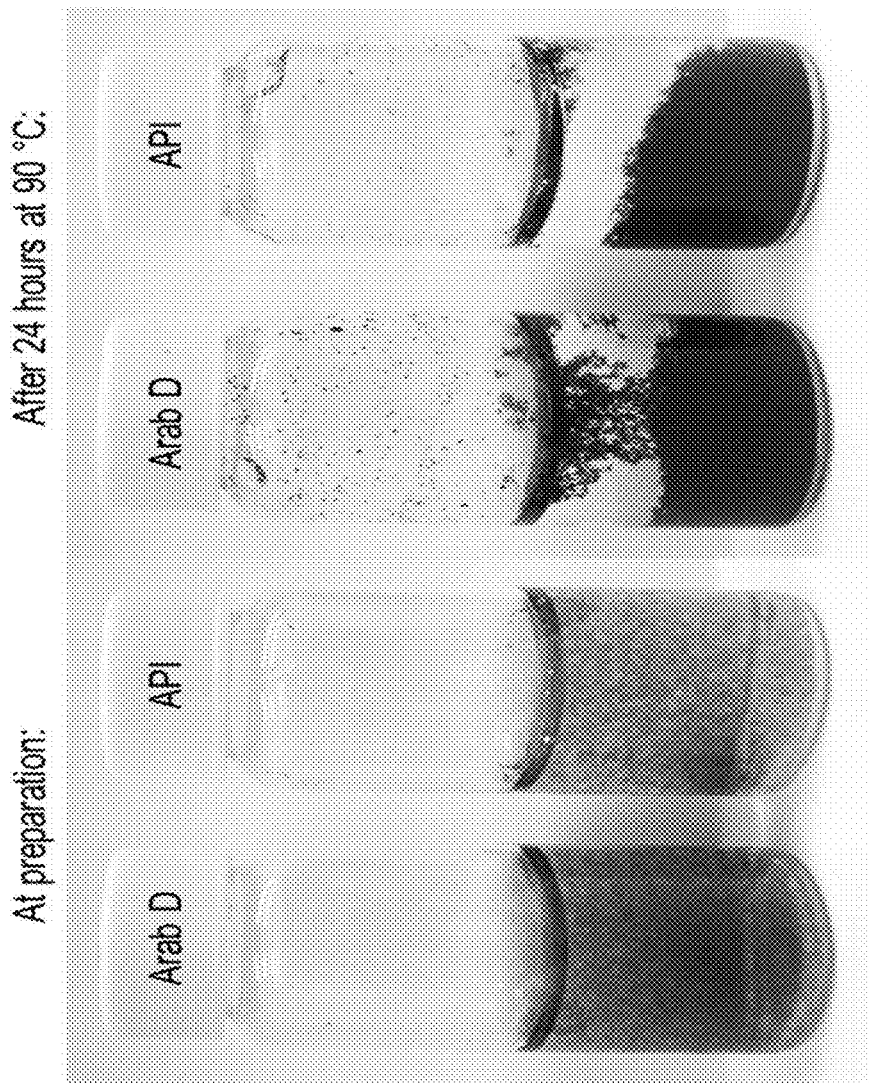
FIG. 2 is a pictorial representation of unstable mixtures of graphene oxide (GO) in Arab-D and API brines at initial preparation and after 24 h at 90° C.

Referring now to FIG. 2, a pictorial representation is shown of unstable mixtures of GO in Arab-D and API brines at initial preparation and after 24 h at 90° C. The Arab-D and API Brines were prepared as shown in Table 1. In Saudi Arabian hydrocarbon-bearing reservoirs, sea water is often injected into wells, and the mixed salts can hinder suspension stability. Preliminary stability testing was performed on mixtures of water-dispersed, submicron sized GO (average DLS determined sheet diameter of 338.2±27.9 nm) with either the Arab-D or API brines. The GO was highly unstable in both brines immediately upon mixing and after 24 h at 90° C., as shown in FIG. 2. GO is not stably dispersed at room temperature or above in the target brines tested, all of which contained divalent ions, including the standard API.

Figure 8:
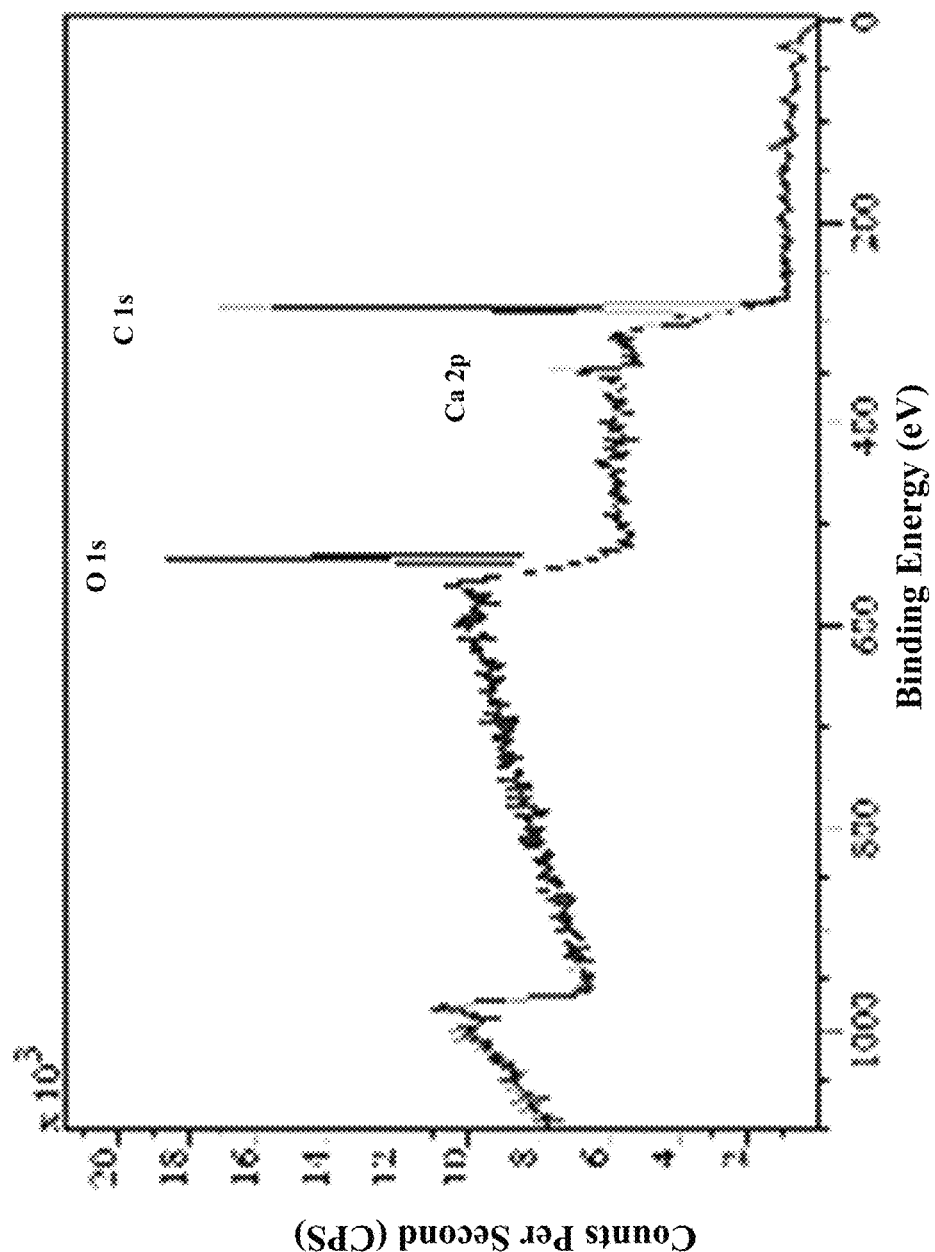
FIG. 8 is an X-ray photoelectron spectroscopy (XPS) spectrum of flocculated GO in API Brine.

XPS of the black flocculated materials after thorough washing (see FIG. 8) revealed only the presence of calcium in addition to the GO's carbon and oxygen signals. FIG. 8 is an X-ray photoelectron spectroscopy (XPS) spectrum of the flocculated GO in API Brine. The spectrum of FIG. 8 shows carbon at 72%, oxygen at 26% and Calcium at 2% atomic percent concentration (At %). Without being bound by any theory or explanation, the lack of stability can be attributed in part to electrostatic crosslinking and destabilization of the negatively charged groups present on the GO sheets, particularly by the divalent calcium ions.

Figure 3:
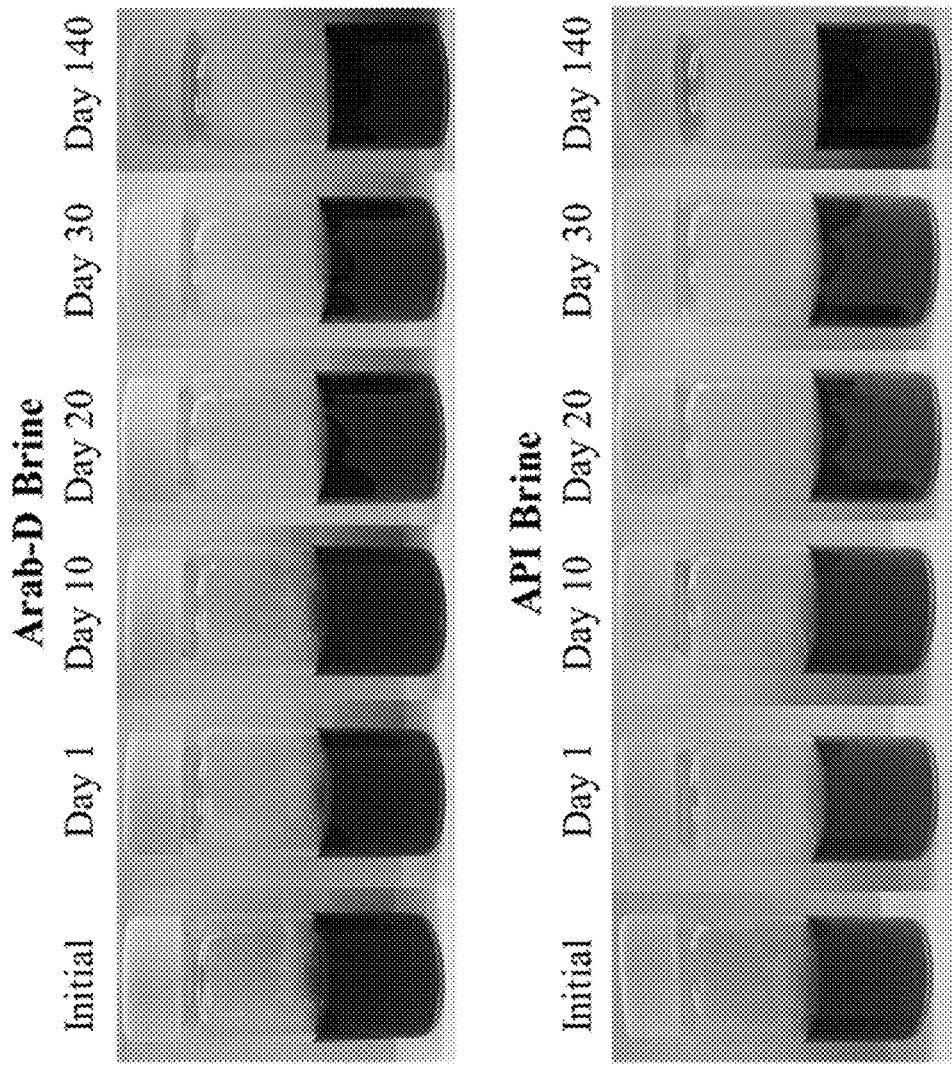
FIG. 3 is a pictorial representation of aliquots of stable zwitterionic PVIM-co-PVPy prGO composite dispersions of the present disclosure in Arab-D and API brines at initial preparation and after 1, 10, 20, 30, and 140 days at 90° C.
Figure 4:
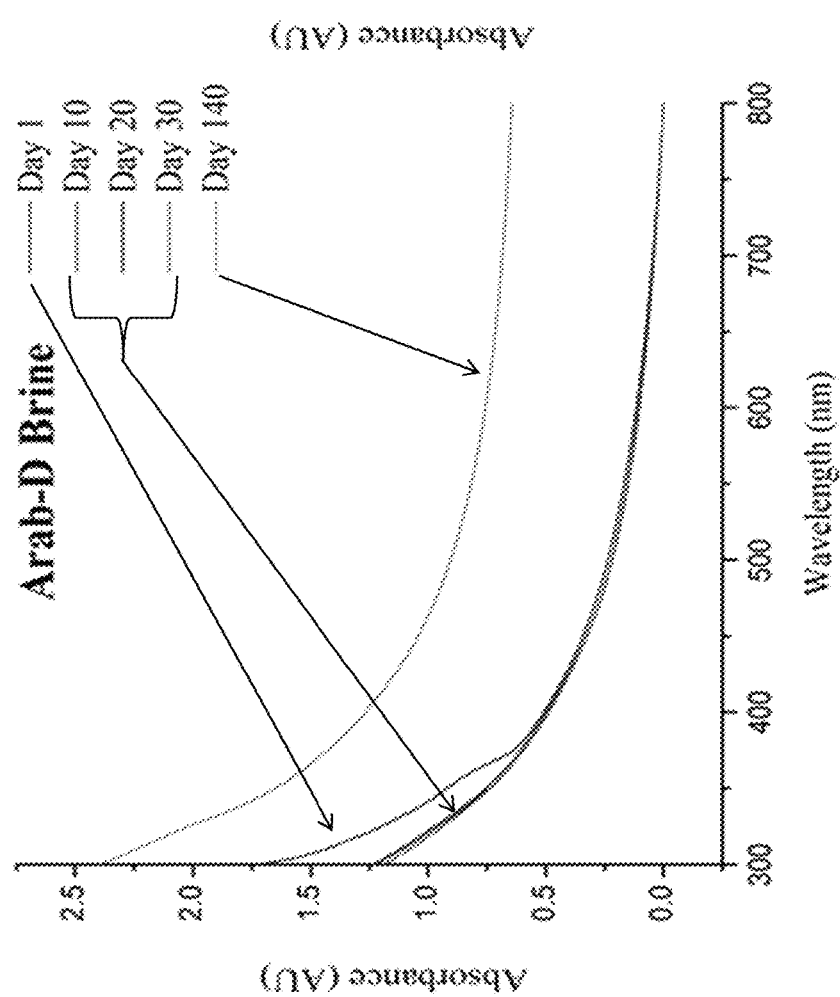
FIG. 4 is a graphic representation of ultraviolet visible (UV-Vis) spectroscopy data of zwitterionic PVIM-co-PVPy prGO composite dispersions mixed in Arab-D Brine at days 1, 10, 20, 30, and 140 at 90° C.
Figure 5:
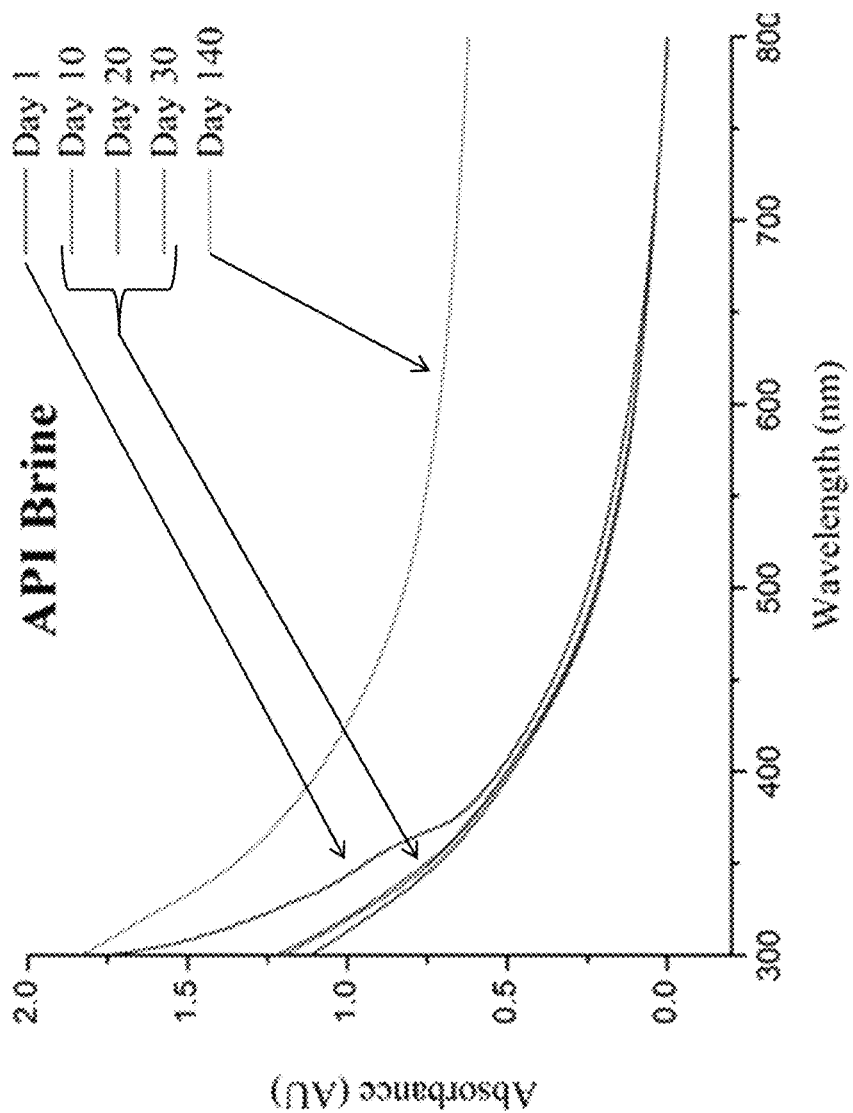
FIG. 5 is a graphic representation of UV-Vis spectroscopy data of zwitterionic PVIM-co-PVPy prGO composite dispersions mixed in API Brine at days 1, 10, 20, 30, and 140 at 90° C.

Brine Stability Testing of Zwitterionic PVIM-Co-PVPy prGO Composite at 90° C.:

Referring now to FIG. 3, to two separate capped bottles with seals labeled Arab-D and API brine were added 90 mL of each respective brine solution. Then 10 mL of the zwitterionic PVIM-co-PVPy prGO composite in water were added to each vial to afford 9:1 volume ratios of brine to the zwitterionic PVIM-co-PVPy prGO composite in water. The bottles were sonicated for 5 minutes and then allowed to stand undisturbed in an oven set at 90° C. After the initial preparation, a small aliquot of each dispersion was removed for UV-Vis spectroscopic (% T) and DLS characterization. Aliquots (3 mL) for characterization were taken immediately after preparation (before heating), after 24 hours (day 1), and again on days 10, 20, 30, and 140. Pictures were taken on those days in smaller scintillation vials and those solutions were promptly returned to the larger bottles (FIG. 3).

As shown in FIG. 3, photographs of the aliquots taken showed no noticeable evidence of instability, flocculation, agglomeration, or settling of the dispersed composite in either the Arab-D or API brines after one month at 90° C. In order to monitor the dispersion stability quantitatively, the percent transmittance of the dispersions were examined as shown in FIGS. 4-7. It was observed that the initial and day one data were essentially superimposable for the initial and day one curves in Arab-D and with only subtle differences being detected in the API brine.

Lower transmittance (higher absorbance) in the ranges of 300-350 nm was present initially and at day 1, which was not present in the day 10, 20, 30, and 140 curves. GO possesses absorption bands in this region and their disappearance after 10 days is likely an indication of on-going thermal reduction processes at the elevated brine temperatures. The most notable changes in the transmittance data were in the range of about 500 to about 600 nm. Examination of the % T values at the arbitrarily chosen wavelength of 550 nm revealed that the transmittance changed most between the initial and first day and then remained essentially stable over the month long test period until day 140, where absorbance over the entire UV-Vis spectrum increased. This is likely due to both a reduction of the graphene sheets as well as an increase in the concentration of graphene in the day 140 dispersion.

The visual inspections and the spectroscopic data both show that the zwitterionic PVIM-co-PVPy prGO composite is stable in the brines. Furthermore, the lack of observable precipitates/flocculants and the negligible changes in the monitored transmittance (as a function of time) suggest that polymer desorption was not occurring appreciably as a result of the covalent, C—C attachment between the polymer and the basal plane.

As discussed previously, the PVIM-co-PVPy prGO composite was isolated by precipitation, washed, and subsequently reacted with 1-propane sultone in methanol to achieve a post-reaction functionalization of the imidazole groups to form the target imidazole-sulfobetaine groups and impart zwitterionic character on the prGO attached polymer chains to form the zwitterionic PVIM-co-PVPy prGO composite. The resulting black dispersion was found to be highly stable and resisted isolation by centrifugation (even at 10,000 rpm for 10 min). Therefore, it was decided to isolate the fraction of the composite that remained as a stable black aqueous dispersion in water after centrifugation by removal of the methanol solvent in vacuo.

Without being bound by any theory or explanation, the solids isolated by centrifugation may represent less functionalized materials and/or crosslinked aggregates composed of multiple GO sheets. The stability of the zwitterionic PVIM-co-PVPy prGO composite in the brines may be due in part to residual surface charges present. The composite likely exhibits negatively charged groups present from the prGO sheets, helping to stabilize the material in water. The concentration of composite in aqueous dispersion was examined by drying a known volume of the dispersion in vacuo. The concentration of solids was approximately 11 mg/mL. XPS analysis of the solids confirmed the presence of C, N, O and S in the composite sample as shown by FIG. 9.

Figure 9:
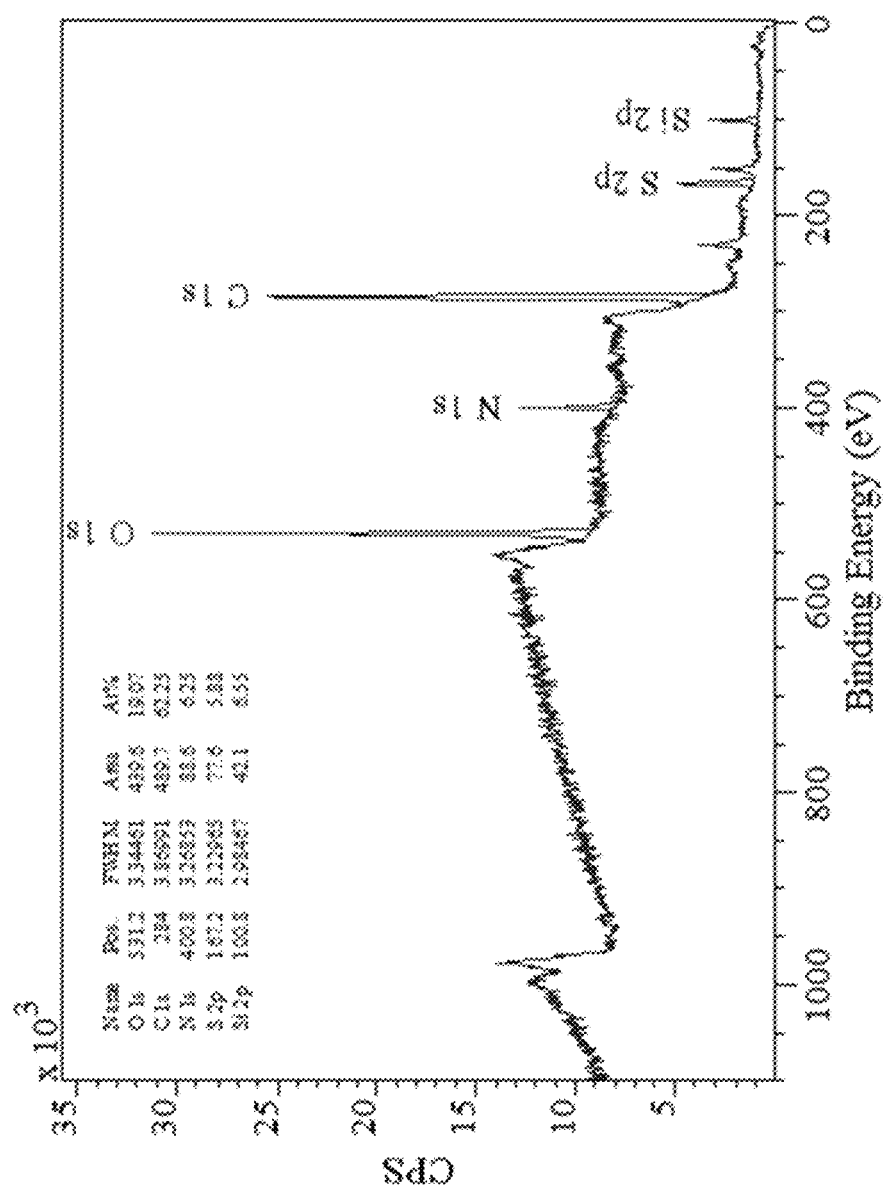
FIG. 9 is an XPS spectrum of zwitterionic PVIM-co-PVPy prGO composite showing the presence of carbon, oxygen, nitrogen, and sulfur.
Figure 10:
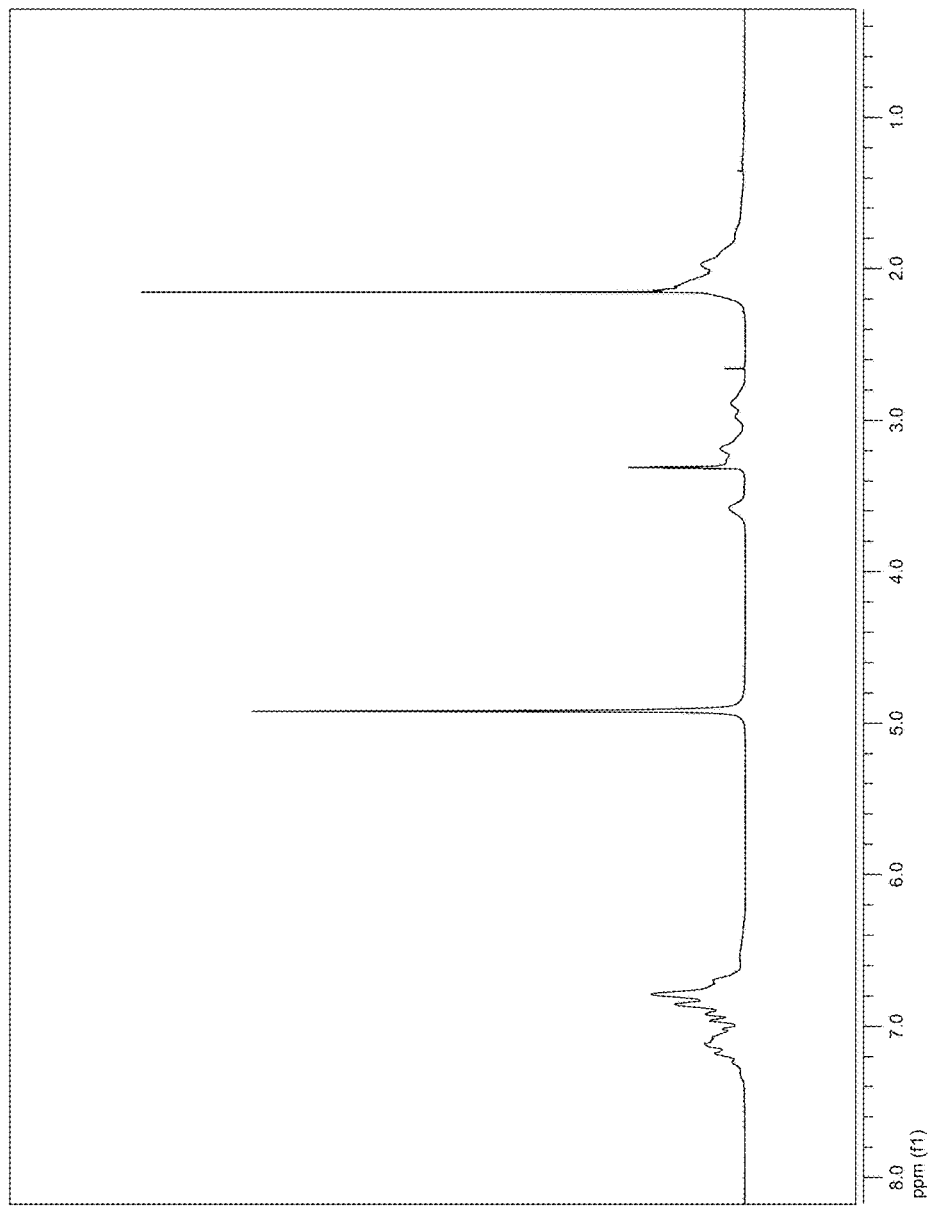
FIG. 10 is a graph produced by proton nuclear magnetic resonance (H NMR) for the poly(vinylimidazole)-co-poly(aminostyrene) (also referred to as PVIM-co-PVPy).

Referring now to FIG. 9, an XPS spectrum is shown of zwitterionic PVIM-co-PVPy prGO composite showing the presence of carbon, oxygen, nitrogen, and sulfur. Without being bound by any theory or explanation, the silicon peak is likely due to contamination from glassware and is consistent with diazonium literature in the field.

Figure 6:
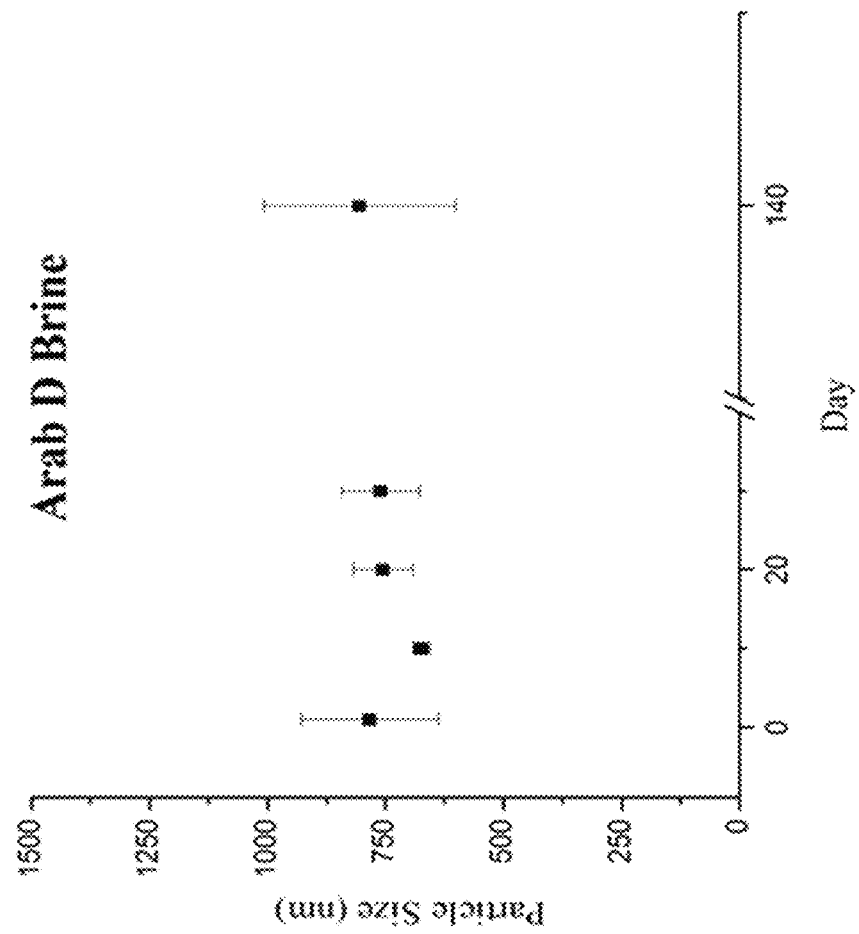
FIG. 6 is a graphic representation of dynamic light scattering (DLS) data of zwitterionic PVIM-co-PVPy prGO composite dispersions mixed in Arab-D Brine at days 1, 10, 20, 30, and 140 at 90° C.
Figure 7:
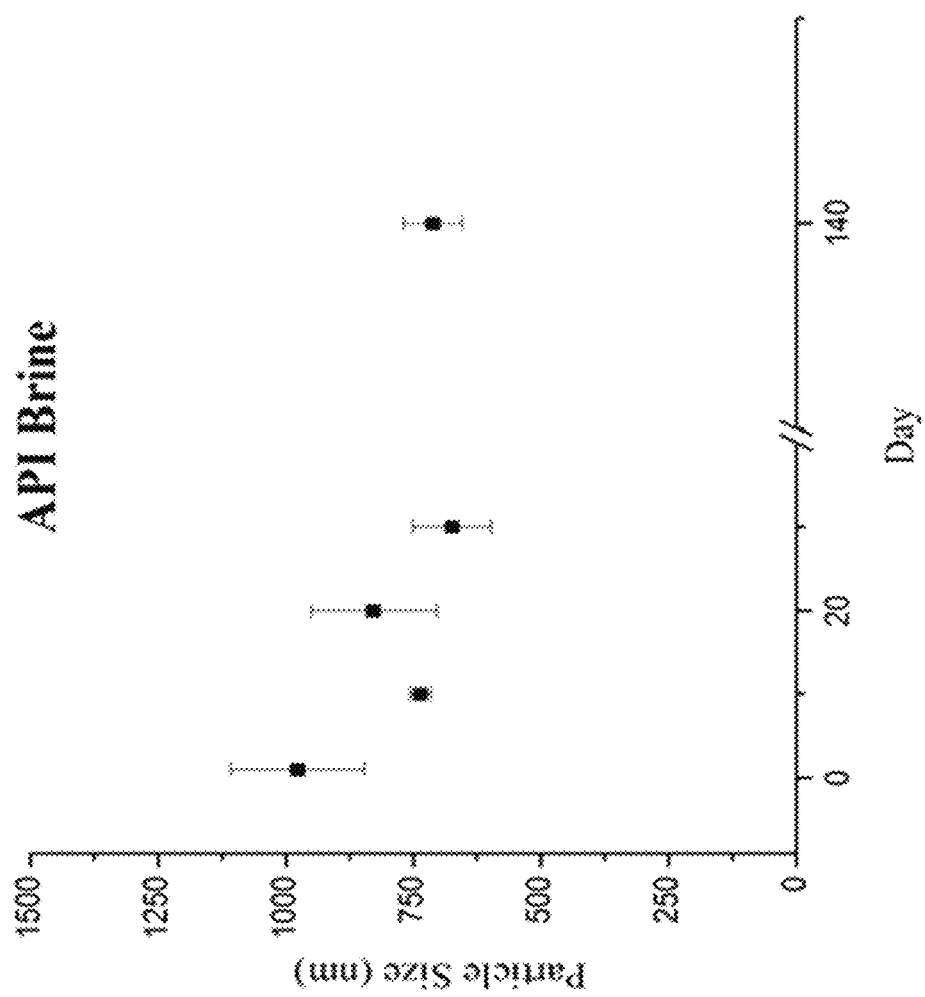
FIG. 7 is a graphic representation of DLS data of zwitterionic PVIM-co-PVPy prGO composite dispersions mixed in Arab-D Brine at days 1, 10, 20, 30, and 140 at 90° C.

Referring now to FIGS. 6 and 7, further corroboration of the zwitterionic PVIM-co-PVPy prGO composite's stability in brine was obtained from DLS data recorded on the dispersions in order to examine changes in the hydrodynamic diameter of the composite over time when heated at 90° C. Based on DLS data, the average hydrodynamic diameter of the non-functionalized GO sheets in water was found to be about 338.2±27.9 nm. The data for the initially-prepared zwitterionic PVIM-co-PVPy prGO composite dispersed in Arab-D brine, shown in FIG. 6, demonstrated particles with a mean diameter of 770±92 nm. In API brine, shown in FIG. 7, the zwitterionic PVIM-co-PVPy prGO composite exhibited a mean diameter of 1077±218 nm.

Without being bound by any theory or explanation, it is likely that the composite dispersed in brine was formed of pseudo-spherical nanoparticles comprised of prGO nanosheets wrapped by attached zwitterionic PVIM-co-PVPy prGO composite chains. In the high-ionic-strength environment of the brines, the electrolyte ions present can effectively screen the interactions of the zwitterionic sulfobetaine ionic groups, and the chains can expand providing sufficient steric repulsion effect to stabilize and prevent aggregation/flocculation of the composite particles. The DLS measured diameters of the composite dispersion in Arab-D brine showed excellent stability over 30 days with a stable mean diameter of about 750 nm. In the case of the API brine dispersed composite, the initial data points indicated particles of about one micron size in diameter that stabilized over time to a mean diameter of about 750 nm (based on the day 10, 20, 30, and 140 data points).

The ability to introduce addressable nano-materials into oil reservoirs provides the ability to investigate the internal state of oil wells with the goal of enhancing their output and productivity. In the exemplified embodiments of the present disclosure, stable sub-micron sized GO nanosheets were pursued as a platform material based broadly on the relative ease of modification of its basal plane through known chemistries. However, one of ordinary skill in the art will realize the application of the present disclosure to other carbonaceous materials including, but not limited to, for example carbon nanotubes, carbon black, activated carbon, $C_{60}$, carbon dots, and any nanomaterial composed primarily of carbon.

The surprising stability of the zwitterionic PVIM-co-PVPy prGO composite in the brines, particularly the higher ionic strength Arab-D brine (containing a higher content of divalent ion species, such as calcium (II) and magnesium (II)) was promising and unexpected. The relative stability of the composite particles lasted for 140 days with no appreciable destabilization having occurred up to that point. The composite dispersions can exhibit prolonged stability at elevated temperatures in brine. In further tests, the stability of the materials in brines up to 90° C. was beyond 140 days.

Partially-reduced graphene covalently functionalized with a polyzwitterionic polymer was synthesized and shown to display highly stable solutions in the high-salinity brines known as Arab-D and API at elevated temperatures for 140 days. Stability of the dispersions is shown by visual inspection, spectroscopic monitoring, and the relative stability of the particle sizes as determined by DLS. Creating brine-stable, graphene-based systems has been a challenge, and the functionalization of graphene basal plane, as disclosed herein, represents an attractive and useful platform. The polymer developed may be applicable in imparting brine stability to other types of particles or materials. The application of the polyzwitterion-graphene system is of use in the petroleum industry for reservoir mapping and/or improving oil recovery.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges can be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention can suitably comprise, consist or consist essentially of the elements disclosed and can be practiced in the absence of an element not disclosed.

What is claimed is:

1. A composition for stabilizing dispersed particles in an ionically charged solution, the composition comprising:
    a carbonaceous substrate, the carbonaceous substrate operable to undergo a grafting-to approach for functionalization;
    a stabilizing polymer, the stabilizing polymer grafted to the carbonaceous substrate where the stabilizing polymer comprises at least one grafting-to segment, the at least one grafting-to segment forming a diazonium species from an aniline moeity, the diazonium species permitting the at least one grafting-to segment of the stabilizing polymer to be covalently bound to the carbonaceous substrate; and a plurality of positively and negatively charged subgroups, the plurality of positively and negatively charged subgroups positioned within the stabilizing polymer, where the plurality of positively and negatively charged subgroups are operable to stabilize the dispersed particles amongst positively and negatively charged ions when dispersed in an ionically charged solution.

2. The composition according to claim 1, where the carbonaceous substrate comprises partially-reduced graphene oxide.

3. The composition according to claim 1, where the composition comprises dispersed particles with a mean diameter size of between about 750 nanometers (nm) and about 1 micron.

4. The composition according to claim 1, where the composition comprises dispersed particles with a mean diameter size of between about 700 nm and about 800 nm.

5. The composition according to claim 1, where the stabilizing polymer comprises poly(vinylimidazole)-co-poly(aminostyrene).

6. The composition according to claim 1, wherein the stabilizing polymer comprises a polyzwitterionic polymer.

7. The composition according to claim 6, wherein the stabilizing polymer comprises imidazole-sulfobetaine groups.

8. The composition according to claim 1, where the plurality of positively and negatively charged subgroups are operable to stabilize the dispersed particles amongst positively and negatively charged ions within brine solution comprising sodium, calcium, and chloride ions.

9. The composition according to claim 1, where the plurality of positively and negatively charged subgroups are operable to stabilize the dispersed particles amongst positively and negatively charged ions within brine solution comprising sodium, calcium, magnesium, chloride, barium, sulfate, and bicarbonate ions.

10. The composition according to claim 1, where the composition comprises zwitterionic poly(vinylimidazole)-co-poly(aminostyrene) partially-reduced graphene oxide composite.

11. A method for making a composition for stabilizing dispersed particles in an ionically charged solution, the method comprising the steps of:
preparing a carbonaceous substrate such that the carbonaceous substrate is operable to undergo a grafting-to approach for functionalization;
preparing a stabilizing polymer;
covalently bonding the carbonaceous substrate and the stabilizing polymer to form a combined particle;
imparting a plurality of positive and negative charges to the stabilizing polymer; and
stabilizing the combined particle in the ionically charged solution to avoid agglomeration, by using the plurality of positive and negative charges to stabilize the combined particle amongst positively and negatively charged ions when dispersed in an ionically charged solution.

12. The method according to claim 11, where the method further comprises the step of preparing the stabilizing polymer as a diazonium salt for grafting to the carbonaceous substrate.

13. The method according to claim 11, where the method further comprises the step of partially reducing graphene oxide.

14. The method according to claim 11, where the method further comprises the step of forming dispersed particles with a mean diameter size of between about 750 nanometers (nm) and about 1 micron.

15. The method according to claim 11, where the method further comprises the step of forming dispersed particles with a mean diameter size of between about 700 nm and about 800 nm.

16. The method according to claim 11, where the method further comprises the step of preparing a polymer comprising poly(vinylimidazole)-co-poly(aminostyrene).

17. The method according to claim 11, wherein the method further comprises the step of forming a polyzwitterionic polymer.

18. The method according to claim 17, wherein the polyzwitterionic polymer comprises imidazole-sulfobetaine groups.

19. The method according to claim 11, where the method further comprises the step of stably dispersing the combined particle amongst positively and negatively charged ions within brine solution comprising sodium, calcium, and chloride ions.

20. The method according to claim 11, where the method further comprises the step of stably dispersing the combined particle amongst positively and negatively charged ions within brine solution comprising sodium, calcium, magnesium, chloride, barium, sulfate, and bicarbonate ions.

21. The method according to claim 11, further comprising the step of forming zwitterionic poly(vinylimidazole)-co-poly(aminostyrene) partially-reduced graphene oxide composite.

22. The method according to claim 11, further comprising the step of injecting the combined particle into a hydrocarbon-bearing reservoir formation to characterize the formation.

23. The composition according to claim 1, where the stabilizing polymer further comprises at least one zwitterionic segment, the at least one zwitterionic segment comprising at least one positively charged subgroup and at least one negatively charged subgroup, the at least one positively charged subgroup and the at least one negatively charged subgroup operable to stabilize the dispersed particles amongst positively and negatively charged ions within the ionically charged solution.

24. The composition according to claim 1, where the stabilizing polymer further comprises at least one polymer segment, the at least one polymer segment comprising a labile linker and an agent, the agent operable to be released to cleave the labile linker.

25. The composition according to claim 23, where the at least one zwitterionic segment comprises an imidazole group.

26. The composition according to claim 23, where the molar feed ratio of the at least one zwitterionic segment and the at least one grafting-to segment is about 9:1.

* * * * *